UNITED STATES PATENT OFFICE.

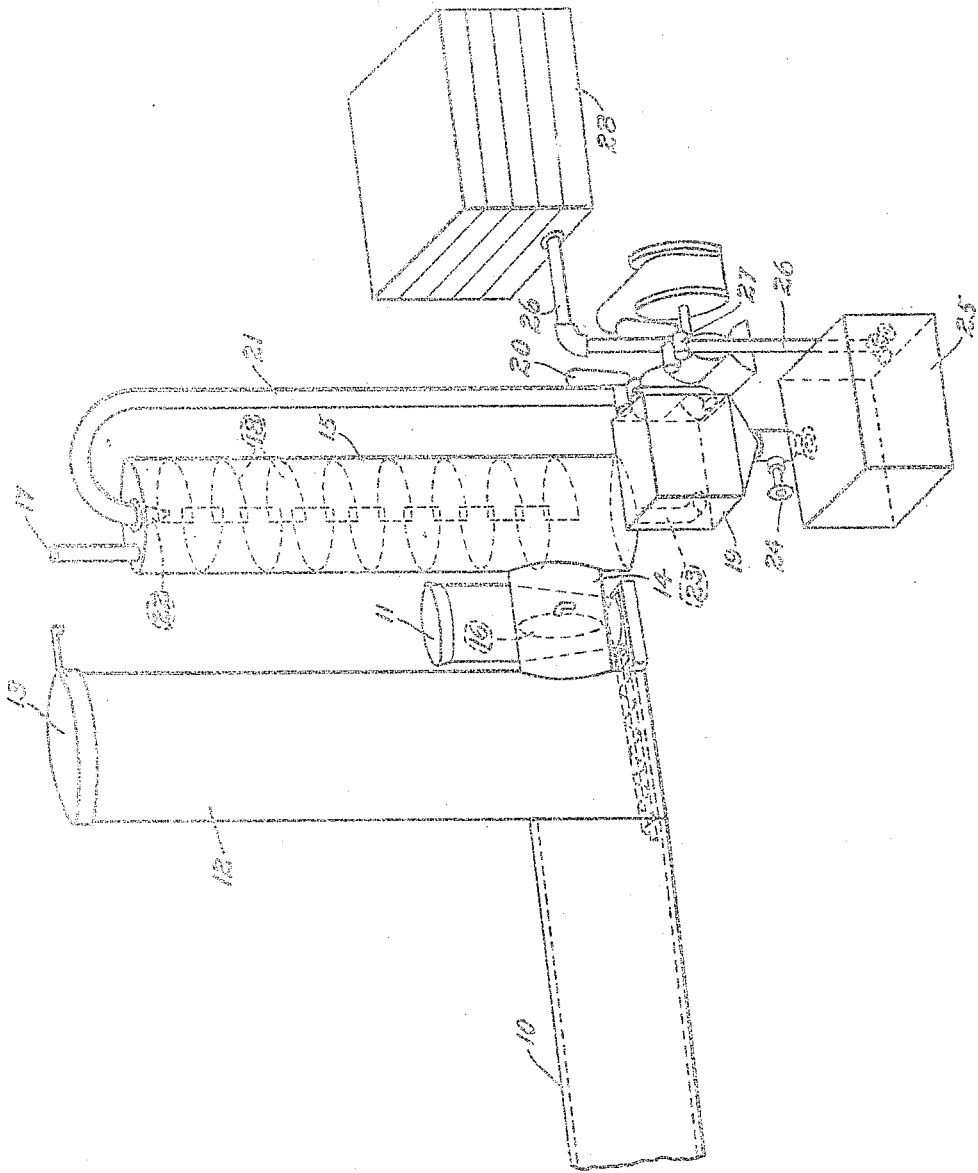

HENRY BLUMENBERG, JR., OF LOS ANGELES, CALIFORNIA.

PROCESS OF MAKING POTASSIUM CHLORID.

1,296,461.  Specification of Letters Patent.  Patented Mar. 4, 1919.

Application filed January 28, 1918. Serial No. 214,213.

*To all whom it may concern:*

Be it known that I, HENRY BLUMENBERG, Jr., a citizen of the United States, residing at Los Angeles, in the county of Los Angeles and State of California, have invented new and useful Improvements in Processes of Making Potassium Chlorid, of which the following is a specification.

My invention relates to a process of producing potassium chlorid direct from waste gases of cement kilns and the like which carry potassium compounds in suspension.

One method of producing potassium compounds is to use potassium containing materials in the production of Portland cement. In the high temperatures of the kiln the potassium is volatilized mostly in the form of potassium oxid $K_2O$ and carried off in the waste gases with a mixture of cement dust. Various means are employed for recovering the potassium from these waste gases. The present invention has for its object the recovery of potassium in the form of potassium chlorid without the use of hydrochloric acid which is expensive, an inexpensive reagent such as sodium chlorid being used to convert the potassium compounds to potassium chlorid.

My invention depends upon the fact that the affinity of potassium for chlorin is greater than that of sodium and other metals, especially in the presence of water and carbon dioxid in the temperatures obtaining in the hot waste gases of a cement kiln.

My invention consists in the steps of the process hereinafter described and claimed.

In the accompanying drawings I have illustrated by way of example an apparatus suitable for carrying out my process.

In the drawings, 10 designates a portion of a cement kiln which is here shown to be of a rotary cylindrical type. 11 indicates a suitable apparatus whereby the raw material is fed into the stack end of the cement kiln 10. The waste gases enter the lower end of a stack or chimney 12 which, however, is only used when for any reason the potassium recovering apparatus hereinafter described is not in operation. 13 is a lid or damper normally closing the stack 12. 14 is a conduit for conveying the waste gases into a precipitating chamber or tower 15. 16 is a slide-valve whereby the conduit 14 may be closed. The tower 15 has an exit 17 at the top. A series of baffle plates 18, which are here shown arranged in staggered relation but which may be of any preferred construction, is provided in the interior of the tower 15. 19 is a tank from which, by means of a pump 20, a liquid may be pumped through pipe 21 to the top of the tower 15 and there sprayed by means of a nozzle 22. The liquid is retarded in its downward passage by the baffle plates 18 in the well-known manner, thereby allowing the same to become intimately mixed with the waste gases coming from the cement kiln 10. The liquid collecting at the bottom of the tower 15 is returned, by means of pipe 23, to the tank 19 which latter is provided with a valved outlet pipe 24, whence the liquid may be conveyed to an evaporating pan 25, which, by means of a valved pipe 26 and pump 27, is connected to a filter press 28 for separating the liquid from the solid constituents.

I dissolve sodium chlorid (common salt) in water in the tank 19 using an excess of salt above the saturation point of the water. The excess of the salt may be as great as the pump 20 can conveniently handle, and circulate the same by means of pipe 21 through the precipitating tower 15 where the aqueous salt mixture is caused to come in intimate contact with the cement kiln gases containing carbon dioxid, cement dust and potassium oxid in suspension. The cement dust contains also calcium oxid and aluminum silicates, which in the presence of water and carbon dioxid, form calcium carbonate, hydro-silicates, aluminum hydroxid and other compounds. The reactions just mentioned do not concern this process which depends upon the following reaction:

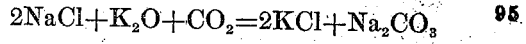

$$2NaCl + K_2O + CO_2 = 2KCl + Na_2CO_3$$

and which is not interfered with by the secondary reactions between the water, carbon dioxid and the cement dust referred to. It may be mentioned here that when the fuel used in burning cement contains sulfur, which is usually the case, potassium sulfate is formed in varying quantities. The resulting magma or slurry is repeatedly circulated through the tank and precipitating tower until sufficiently enriched with potassium chlorid and is then drawn off to the evaporating tank 25 where the slurry is evaporated to dryness to render the hydro-silicates insoluble. The dry mass is then treated with hot water and pumped through the filter press 28 which separates the soluble salts from the insoluble residue. The principal salts present in the filtrate are potassium chlorid and sodium carbonate which are in the succeeding operations separated by the well known process of crystallization.

It should be noted that in my process I use an inexpensive reagent, common salt, which sells for from $3.00 to $4.00 per ton, while hydrochloric acid sells for from $40.00 to $50.00 per ton, and that I obtain two valuable products, potassium chlorid and sodium carbonate.

In place of the sodium chlorid, other chlorids, such as the chlorids of the alkali metal or alkaline earth metal may be used, but under normal conditions common salt will be found more available from a commercial standpoint.

While I have described my process in connection with treating waste gases carrying potassium compounds in suspension, it will be understood that my process is also applicable for treating potassium compounds in which the potassium is in an amenable form with sodium chlorid and carbon dioxid.

Various changes in the steps of the process will suggest themselves to those skilled in the art without departing from the spirit of my invention as claimed.

I claim:

1. A process of producing potassium chlorid from waste gases containing carbon dioxid, cement dust and potassium compounds, comprising treating said gases with an aqueous mixture of sodium chlorid, thereby forming potassium chlorid and sodium carbonate, and separating the potassium chlorid from the mixture.

2. A process of producing potassium chlorid from waste gases containing carbon dioxid, cement dust and potassium compounds, comprising treating said gases with an aqueous mixture of sodium chlorid, thereby forming potassium chlorid, dehydrating the mixture to render the hydrous silicates insoluble, treating with water and separating the soluble salts from the mixture and separating potassium chlorid from the remaining salts.

In testimony whereof I have signed my name to this specification.

HENRY BLUMENBERG, Jr.